(No Model.)
J. H. HARRIS.
HARROW.
No. 306,746. Patented Oct. 21, 1884.
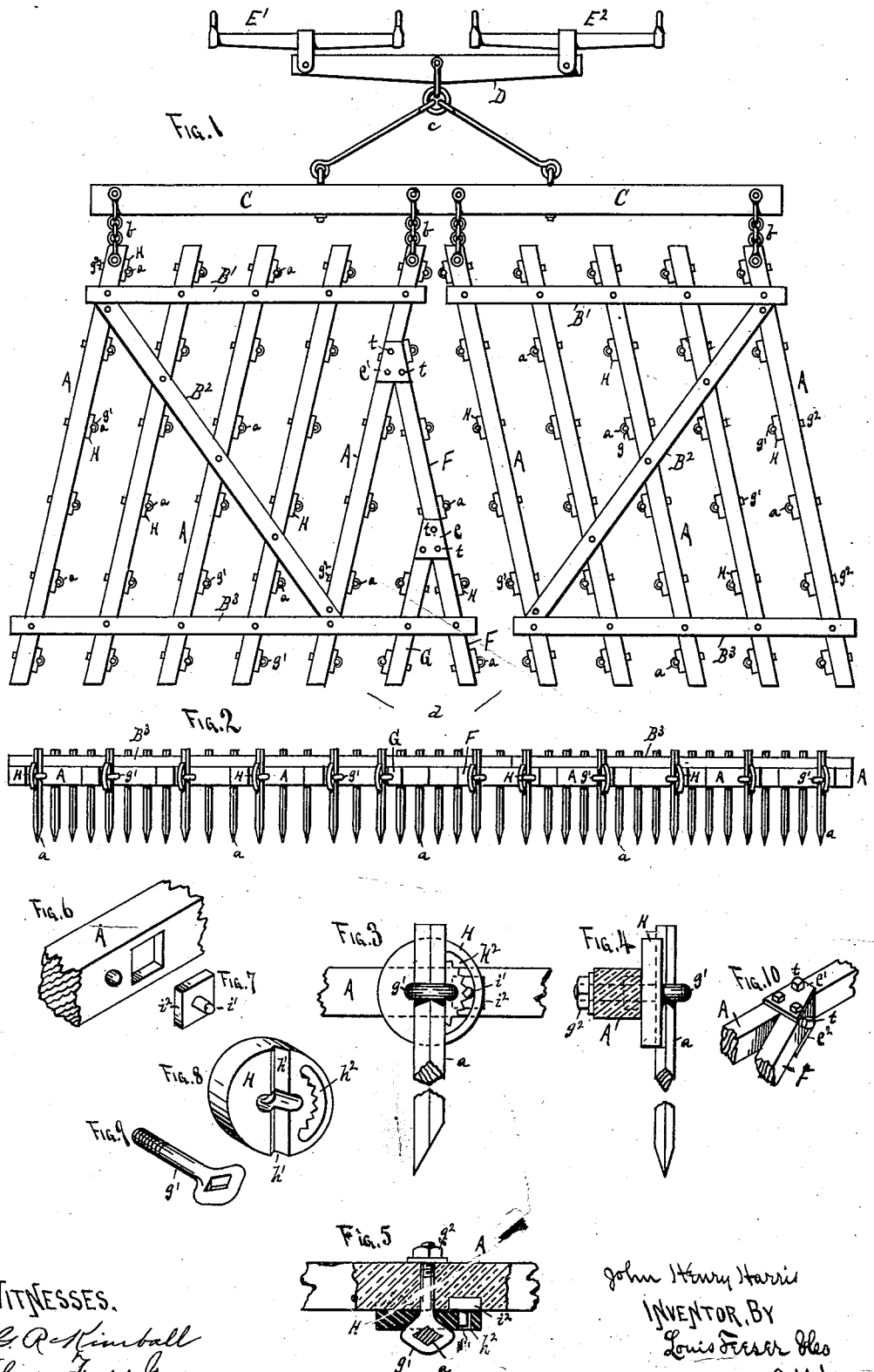
WITNESSES.
G. R. Kimball
Louis Fesser Jr.
John Henry Harris
INVENTOR, By
Louis Fesser & Co
Att'ys.

UNITED STATES PATENT OFFICE.

JOHN HENRY HARRIS, OF ST. PAUL, MINNESOTA.

HARROW.

SPECIFICATION forming part of Letters Patent No. 306,746, dated October 21, 1884.

Application filed January 28, 1884. (No model.)

*To all whom it may concern:*

Be it known that I, JOHN HENRY HARRIS, a citizen of the United States, and a resident of St. Paul, in the county of Ramsey, in the State of Minnesota, have invented certain new and useful Improvements in Harrows, of which the following specification is a full, clear, and exact description, reference being also had to the accompanying drawings, in which—

Figure 1 is a plan view, and Fig. 2 is a rear elevation, of a harrow complete, showing my improvements attached thereto. Fig. 3 is an enlarged side view of a tooth and portion of a tooth-bar to which it is attached. Fig. 4 is an enlarged sectional view across a tooth-bar and front view of a tooth attached thereto, and Fig. 5 is an enlarged sectional plan view of one of the tooth-holders. Figs. 6, 7, 8, and 9 are enlarged detached perspective views of the different parts of one of the tooth-holders. Fig. 10 is a perspective view of a section of one of the tooth-bars and a section of one of the auxiliary bars, showing the method of clamping them together.

A A are the tooth-bars; B' B² B³, the braces connecting the tooth-bars to each other in the ordinary manner, forming what is known as two ordinary "Scotch" or "diagonal" harrows—one a right-hand and the other a reversed or left-hand harrow—and both connected to one common evener or bar, C, by chains or other suitable flexible couplings, $b$, while the single-tree D and whiffletrees E' E² are connected to this evener by rods or chains $c$. In the ordinary diagonal harrow, the draft being from one corner only, the harrow draws heavily, and is liable to vibrate upon its single connection to the single-tree, thus rendering its action uneven, and to avoid this two ordinary diagonal harrows are attached to one evener, C, (one of the harrows being reversed,) whereby all the advantages of the ordinary diagonal harrow are retained, and, in addition, all tendency to vibrate upon its couplings is prevented. This arrangement leaves an A-shaped open space, $d$, between the harrows, and to fill this space and secure an unbroken line of teeth across the full width of both harrows I attach to the inner tooth-bar of one harrow an auxiliary tooth-bar, F, parallel with the tooth-bars of the opposite harrow, and attach in the same manner to this auxiliary bar F a shorter tooth-bar, G, parallel to the bars A of the harrow to which it is attached. The teeth of these auxiliary bars F G will be set so that their points will be equidistant from each other and from the nearest teeth of the adjacent bars A, so that all the teeth will form furrows with equal spaces between them, and with no break between the two harrows, the bars F G completely bridging the space $d$ and securing an unbroken line of teeth across the whole harrow, as shown in Fig. 2. By this improved construction are obtained all the advantages of the hinged or flexible harrow combined with the diagonal harrow, and at the same time, in turning curves or corners, the tooth-bars retain the same relative positions, so that no break or open space occurs between the sections.

The bars F and G may be attached to the bars A and to each other in any desired manner; but I have found that two angular metal plates, $e'\ e^2$, clasping the upper and lower side of the ends of the bars F and A and F and G, and attached thereto by bolts $t$, or other similar fastenings, form a convenient, simple, and very strong clamp.

$a\ a$ represent the teeth of the harrow, which may be made in any desired form, either round, square, oblong, diamond-shaped, as shown, or in any other form. I secure the teeth to the bars A by means of eyebolts $g'$, which clasp the teeth, and are passed backward through the bars, and also through interposed plates H, as shown, and are secured to the bars A by nuts $g^2$. The plates H are formed with grooves or hollows $h'$ across their front faces, in which the teeth $a$ fit, and are also provided with curved slots $h^2$, having their inner edges serrated, into which serrations pins $i'$ on plates $i^2$, set into the faces of the bars A in the rear of the plates H, are adapted to fit, to hold the plates H from revolving upon the bolts $g'$. By this simple means the teeth may be firmly held and clamped to the bars A, and by loosening the nuts $g^2$ and drawing the plates H outward until the pins $i'$ are clear of the serrations in the slots $h^2$ the plates H may be revolved upon the bolts $g'$ to any extent to set the teeth $a$ at any desired angle, and then clamped up again to bring the pin $i'$ into a new serration. The teeth may thus be set and held at any desired angle. The serrations may be placed upon the outside of the disk H, if preferred, the pin $i'$ having a side bend or projection to fit such serrations.

I do not claim other means or constructions for accomplishing the results obtained by the construction which I have described.

Having described my invention and set forth its merits, what I claim is—

1. The combination of two reverse diagonal harrows, one of the harrows having attached to its inner tooth-bar a shorter auxiliary tooth-bar, F, parallel with the tooth-bars of the other harrow, and the said auxiliary tooth-bar having a shorter auxiliary tooth-bar, G, between it and the inner main tooth-bar of the same harrow and parallel therewith, the said auxiliary bars being secured to the contiguous tooth-bars by bolt-plates $e\ e$, and held in place by the rear brace-bar, $B^3$, of the harrow.

2. The combination, with a tooth-bar, A, and tooth $a$, of an eyebolt, $g'$, grooved disk H, having a curved slot, $h^2$, and serrations at its margin, and a pin, $i'$, attached to the tooth-bar, substantially as and for the purpose herein specified.

In testimony whereof I have hereunto set my hand in presence of two subscribing witnesses.

JOHN HENRY HARRIS.

Witnesses:
C. N. WOODWARD,
LOUIS FEESER, Sr.